(12) United States Patent
Curtis

(10) Patent No.: X9296
(45) Date of Patent: Dec. 28, 1835

(54) GOLD, AMALGAM MILL FOR SPARATING FROM ORE

(76) Inventor: Joseph Curtis

Joseph Curtis

The Schedule referred to in these Letters Patent and making
part of the same, containing a description in the words of
the said Joseph Curtis himself of his improvement in
the Amalgam Mill for separating Gold from the Ore To all to whom these Presents shall come.
Be it known that I Joseph Curtis have invented cer-
-tain new and useful improvements in an Amalgam
Mill to take Gold from the Ore. and that the following
is a full and exact description of the construction and
operation of said Machine as invented by me.

A pot or bed piece made of cast Iron ½ an
Inch thick. the pot part a a 10 Inches diameter and
12½ deep to an aperture in the center of an ½ Inch
diameter to draw off the quicksilver by a cock or thumb-
-screw b from the edge of the pot a a. is a plain or
flange c c 24 Inches diameter then a decending flange
d d 2 Inches deep. To this flange is rivetted a cylinder
of sheet Iron e e 1/8 of an inch thick and 14 Inches
deep at the top and outer side is rivetted a wrought
iron hoop 1 Inch broad and 3/8 of an inch thick from
this cylinder a place of discharge or spout f of sheet
Iron 3 Inches square the upper part of which is within
2 Inches of the top (this spout may be contracted. by
means of blocks of wood as the quality of the Ore may
require A frame of timber say 3 Inches square for
the uprights and 2½ Inches by 6 Inches for the cross pie-
-ces is required to support the tube g on which the pully
h is attached for a band, this frame of timber is secured
to the Mill by bolts and nutts passing through the descen-
-ding flange a. and the timber and also by two bolts and nutts passing through the wrought Iron hoop c (at the upper end of the cylinder) and the timber: In the pot within 2 inches of the bottom a wrought Iron bar b say one inch broad and half inch thick is horizontally placed the ends resting on the casting in a bed chipped for that purpose, in the centre of the bar is a hole half an inch in diameter to receive and support the receiving tube g which is of cast Iron 2¼ inch calabre and ⅛ of an inch thick and about 30 Inches long having the lower end capped by a wrought Iron plate with a vertical journal O that runs in the ½ Inch hole in the Iron bar.

Orifices of about 1/14 of an inch are made in the wrought cap and end of the tube below the lower re=-volving plate equalling as nearly the sectional area of the tube, To secure the bar b in its place a wrought Iron hoop not rivetted m is put inside the pot the same being about 1/16 Inch thick and 2 Inches deep. on this rests the plate n. of 10 Inches diameter and ⅛ of an Inch thick having a round hole in the centre of 5 Inches diameter this is secured to its place by another hoop similar to m (and in like manner as many plates as may be required) and the whole is secured by the upper plate P. 11 Inches in diameter which is secured in its place by small screws going into the pot.

To the cast Iron tube 1 Inch from the bottom (resting on a small projection in the casting is a thin wrought iron hoop) shrunk to the tube is a sheet Iron plate, r ⅛ of an inch thick and 9 Inches diameter then a sheet iron hoop or sleve ⅛ of an inch thick and 2 inches broad then another plate similar to r all of which and more if required are [illegible] on by keys or wedges S. is a floating revolver made of pine plank 2 Inches thick and 22 Inches diameter the bottom of which is covered with sheet copper to keep this true and perfectly level it is attached to a [illegible] tube T. 1/2 Inches thick and 14 Inches long that fits the tube but not so tight as to prevent its rising and falling as the fluid may require in the upper end of this tube is inserted an Iron box U (a cart wheel box does well) a groove is chipped 1/4 of an Inch square lengthwise of the box U. and a wrought Iron feather or key about 4 Inches long is fitted to this groove and secured to the cast Iron tube. To the outer edge of this wooden revolver is attached a sheet iron cylinder 1/8 of an Inch thick and 12 Inches deep to stiffen this cylin=der a wrought Iron hoop 1/4 or 3/8 of an Inch thick and 1 Inch broad is rivetted at the upper edge inside this cylin=der. V.

The pully R. for the band is permanently fitted with a castiron box W inside and projecting above the pully say one inch which runs in the brasses X. fitted in the cross beam. the cast iron box can be ajusted so as to keep the tube in its place (which when the quicksilver is in the pot is pressing upwards.

To the cast Iron tube a pipe of tin, Iron or copper Y. with a tunnel top is inserted of sufficient length to be equal to the hydrostatic power required which for the Machine he named must be 60 Inches The quicksilver must fill the pot and say 1 Inch deep on the plain, or flange of 24 Inches. The revolver which floats must have a weight of sand or water inside to cause it to settle, say 1/2 an inch into the quicksilver The Ore must be reduced to an impalpable powder either by dry or wet process, when prepared for this mill it must be wet and conducted in a running stream of water into the tunnel of the upper tube whence it will find its way by its gravity through the orifices in the lower end of the tube and through the quicksilver to the discharge spout f. in the direc=
=tion of the arrows.

The intent of giving the centre part a circular motion is to cause a more thorough distribu=
=tion of the Ore and water among the mercury, the quantity of Ore to the measure of water depends on the earthy State of the Ore.

The revolutions of the Mill may be supposed to average 16 a minute but all depends on the quality of the Ore And I Joseph Curtis do hereby claim as my invention the application of hydrostatic pressure to the passing of Ore through a Stratum of quicksilver by means of the Mechanical combination set forth in the above described Mill or by any other combi=
=nation that may be preferred Joseph Curtis Witnesses
[illegible] Curtis
L. Gaylord Clark

United States Patent
Patent No.: X9296
3 Sheets—Sheet 1.
J. CURTIS.
MILL FOR SEPARATING GOLD FROM ORE.
Patented Dec. 28, 1835.
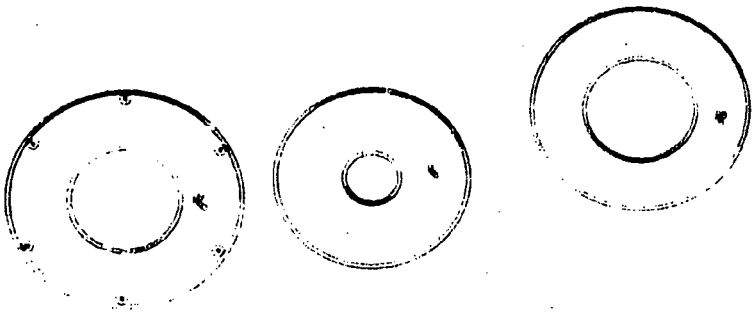
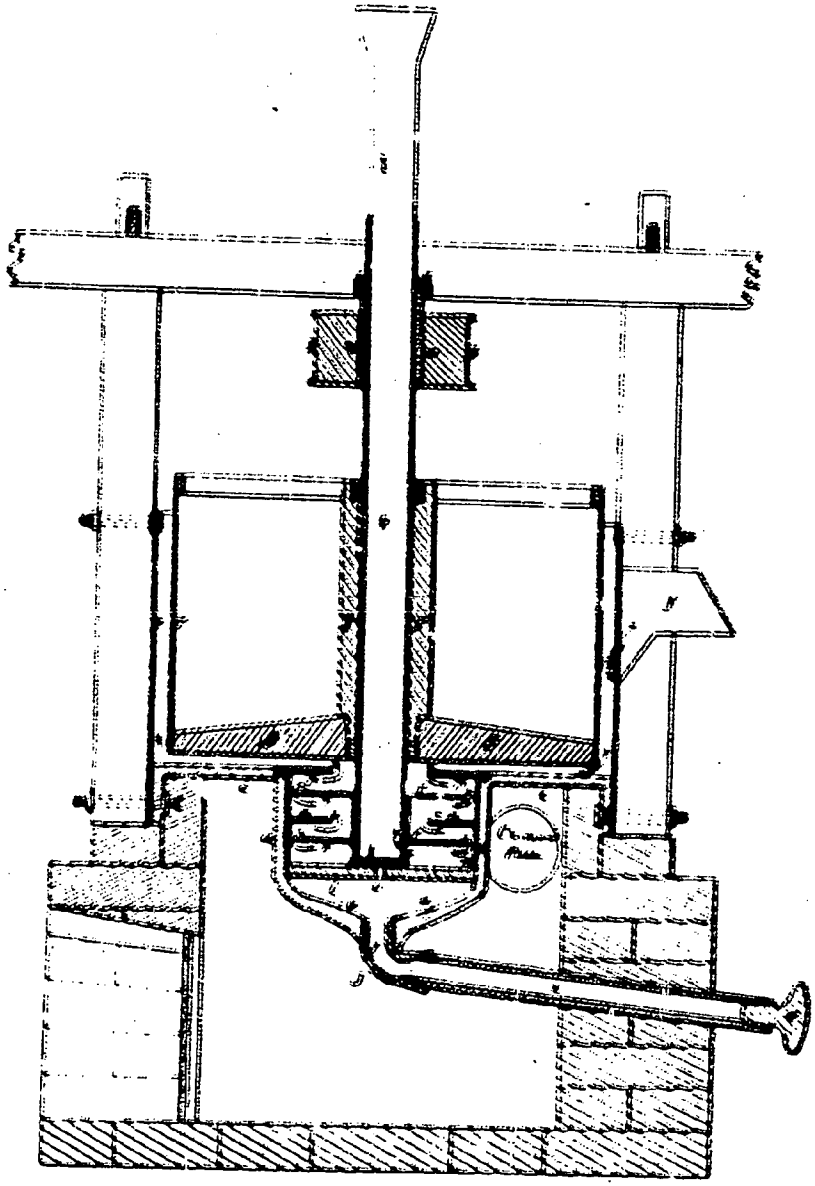

United States Patent
Patent No.: X9296
3 Sheets—Sheet 2.
J. CURTIS.
MILL FOR SEPARATING GOLD FROM ORE.
Patented Dec. 28, 1835.
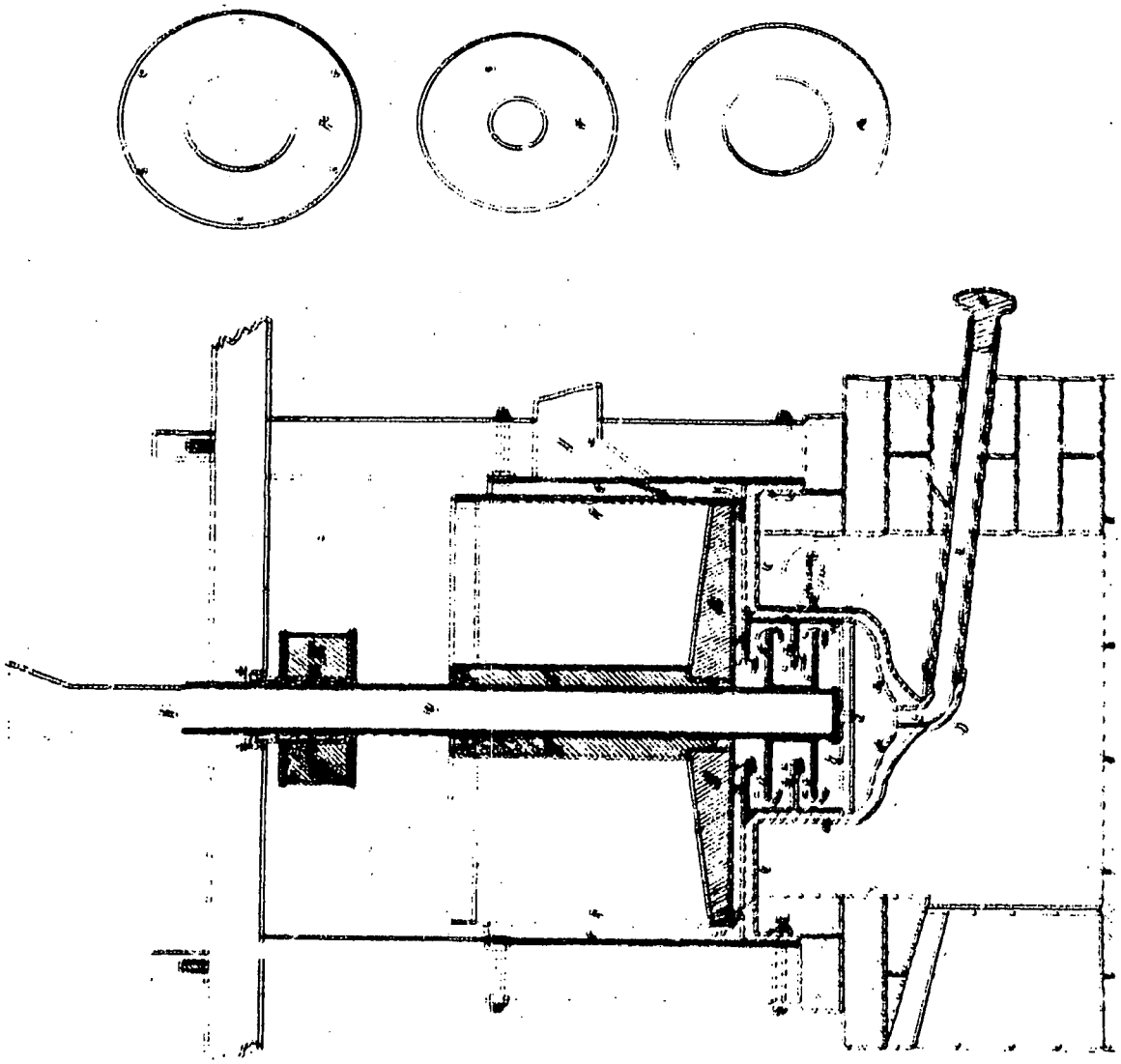

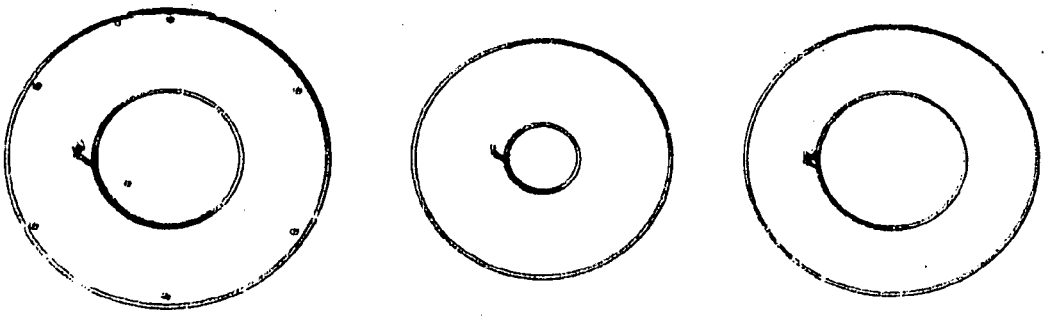
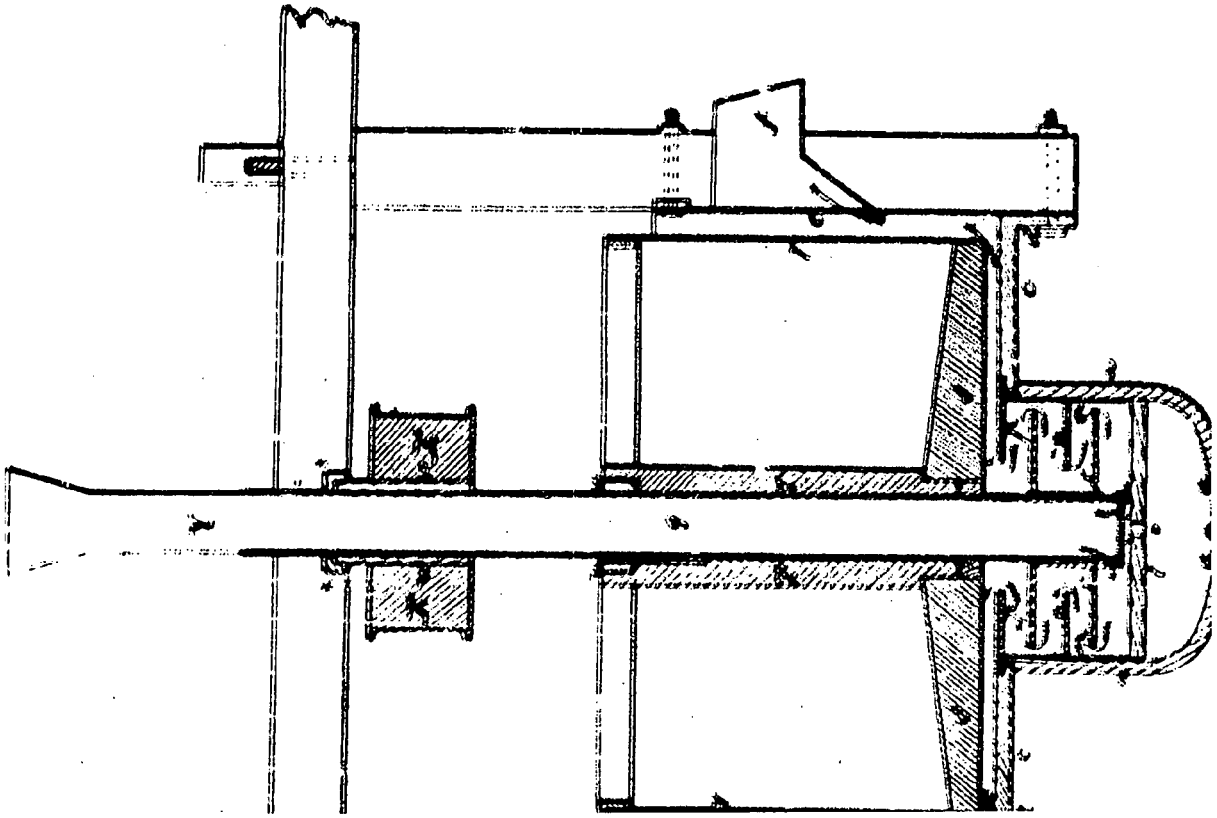

United States Patent
Patent No.: X9296
3 Sheets—Sheet 3.
J. CURTIS.
MILL FOR SEPARATING GOLD FROM ORE.
Patented Dec. 28, 1835.